United States Patent
Walther et al.

[19]

[11] Patent Number: 6,152,666
[45] Date of Patent: Nov. 28, 2000

[54] SCREW FOR USE AS A FASTENER IN FIBROUS MATERIAL SUCH AS WOOD

[75] Inventors: Uli Walther, 1812 West Riverdale, Thunder Bay, Ontario, Canada, P7C 4V2; Mirco Walther, 370-725 James Street S., Thunder Bay, Ontario, Canada, P7E 6N3; Thorsten Walther, 582 Nobel Road, Thunder Bay, Ontario, Canada, P7B 3Y8

[73] Assignees: Uli Walther; Gerda Walther; Mirco Walther; Thorsten Walther, all of Thunder Bay, Canada

[21] Appl. No.: 09/268,790

[22] Filed: Mar. 16, 1999

[30] Foreign Application Priority Data

Apr. 3, 1998 [CA] Canada .................................. 2234040

[51] Int. Cl.[7] ..................................................... F16B 39/30
[52] U.S. Cl. ........................ 411/311; 411/417; 411/387.3
[58] Field of Search ............................. 411/387.1, 387.3, 411/387.4, 387.5, DIG. 1, 417, 418, 411, 311

[56] References Cited

U.S. PATENT DOCUMENTS

| | | | |
|---|---|---|---|
| 3,314,898 | 4/1967 | Purinton ................................. | 411/421 |
| 3,937,119 | 2/1976 | Ernst ....................................... | 85/47 |
| 3,982,575 | 9/1976 | Ollis, Jr. et al. .......................... | 151/22 |
| 4,842,467 | 6/1989 | Armstrong .............................. | 411/399 |
| 4,973,210 | 11/1990 | Osborne et al. ........................ | 411/389 |
| 5,044,853 | 9/1991 | Dicke ..................................... | 411/311 |
| 5,064,323 | 11/1991 | Barnsdale ............................... | 411/178 |
| 5,110,245 | 5/1992 | Hiroyuki ................................ | 411/421 |
| 5,267,423 | 12/1993 | Gianuzzi ................................. | 52/410 |
| 5,340,254 | 8/1994 | Hertel et al. ............................ | 411/311 |
| 5,674,035 | 10/1997 | Hettich et al. .......................... | 411/386 |
| 5,827,030 | 10/1998 | Dicke ..................................... | 411/387 |
| 5,833,415 | 11/1998 | McSherry ................................ | 411/31 |
| 5,897,280 | 4/1999 | Dicke ..................................... | 411/411 |

FOREIGN PATENT DOCUMENTS

| | | |
|---|---|---|
| 385906 | 4/1908 | France . |
| 28 15 247 | 10/1979 | Germany . |
| 295 04 559 U1 | 3/1996 | Germany . |
| 667051 | 2/1952 | United Kingdom . |
| 1120991 | 7/1968 | United Kingdom . |

*Primary Examiner*—Lynne H. Browne
*Assistant Examiner*—John B. Walsh
*Attorney, Agent, or Firm*—Hovey, Williams, Timmons & Collins

[57] ABSTRACT

The thread (15) of a wood or the like screw has pairs of V-shaped recesses (22, 23) in the edge of a selected intermediate length of the thread (17). Each pair defines a W-shaped cutout (19, 20, 11). The cutouts (19–21) extend into only a part of radial width of the thread (15). There are only about five cutouts (19–21) at each convolute (17) of the limited length. The lengths of the thread portion (16) at the tip and the thread portion (18) at the head (13) of the screw are devoid of the cutouts. Each cutout defines a cutting tooth (24) which facilitates the driving of the screw into the workpiece. The recesses (22, 23) provide cavities for fibrous debris generated by the respective tooth (24). When the screw is in place, the teeth (24) are pressed axially toward the thread produced in the workpiece to reduce the loosening tendency of the installed screw. The disposition and size of the cutouts (19–21), is about three cutouts per one convolute so as not to unduly impede the torque strength of the screw.

18 Claims, 2 Drawing Sheets

SCREW FOR USE AS A FASTENER IN FIBROUS MATERIAL SUCH AS WOOD

BACKGROUND OF THE INVENTION

This invention relates to woodscrews or the like type of screws for use in fibrous material such as wood, particularly the self tapping screws. Such screws are typically provided with a smooth, continuous thread. This arrangement is satisfactory where the density of the workpiece of fibrous material is relatively low or where a pilot hole is provided. However, when the wood, fibrous board or the like fibrous material is relatively dense, or a pilot hole is not practical, a high torque may be required to drive the screw fully into the workpiece. It is not uncommon, particularly with the use of a power screwdriver, that the high torque requirement results in breakage of the screw. The splitting of the workpiece may also occur.

It would therefore be of advantage to have a screw for use with fibrous material which would provide a high pull-out and loosening resistance while avoiding or at least reducing the possibility of breakage of the fastener while it is driven into the workpiece.

UK Patent Specification 1,120,991 describes a wood screw wherein the thread on the shank is provided with grooves extending helically for substantially the full length of the threaded portion. Thus the thread is transformed into a number of radially outwardly projecting protuberances.

The drawback is in a substantially weakened overall torque strength of the screw and are thus prone to breakage particularly when used with a power screwdriver. Also, the cutouts do not provide sufficient space for debris formed by the cutting edge of the respective cutout. The cutouts at the tip hamper the guidance of the screw at the introduction into the workpiece.

OBJECT AND SUMMARY OF THE INVENTION

It is an object of the invention to facilitate the installation of screws in a fibrous workpiece such as a wood workpiece by reducing the force required to drive the screw into the workpiece while retaining a good torque strength of the screw and avoiding the tendency of self-loosening of the screw once in place.

According to the invention, only a limited portion of the overall length of the thread is provided with radially inwardly narrowing cutouts. Preferably, in accordance with another feature of the present invention, the cutouts are each comprised of a pair of closely spaced V-shaped cutout section which provide about three W-shaped cutouts about a single convolute of the thread in the limited portion. The limited portion of the thread is an intermediate portion disposed axially between the first end or tip and the second end or head end portion of the thread which are both devoid of the cutouts.

BRIEF DESCRIPTION OF THE DRAWINGS

The invention will now be described by way of a preferred and exemplary embodiments, with reference to the accompanying diagrammatic, not-to-scale drawings.

DETAILED DESCRIPTION OF THE PREFERRED AND EXEMPLARY EMBODIMENTS

The same reference numbers are used for equivalent parts even though different embodiments of the present invention may be shown and described.

Figure 1:
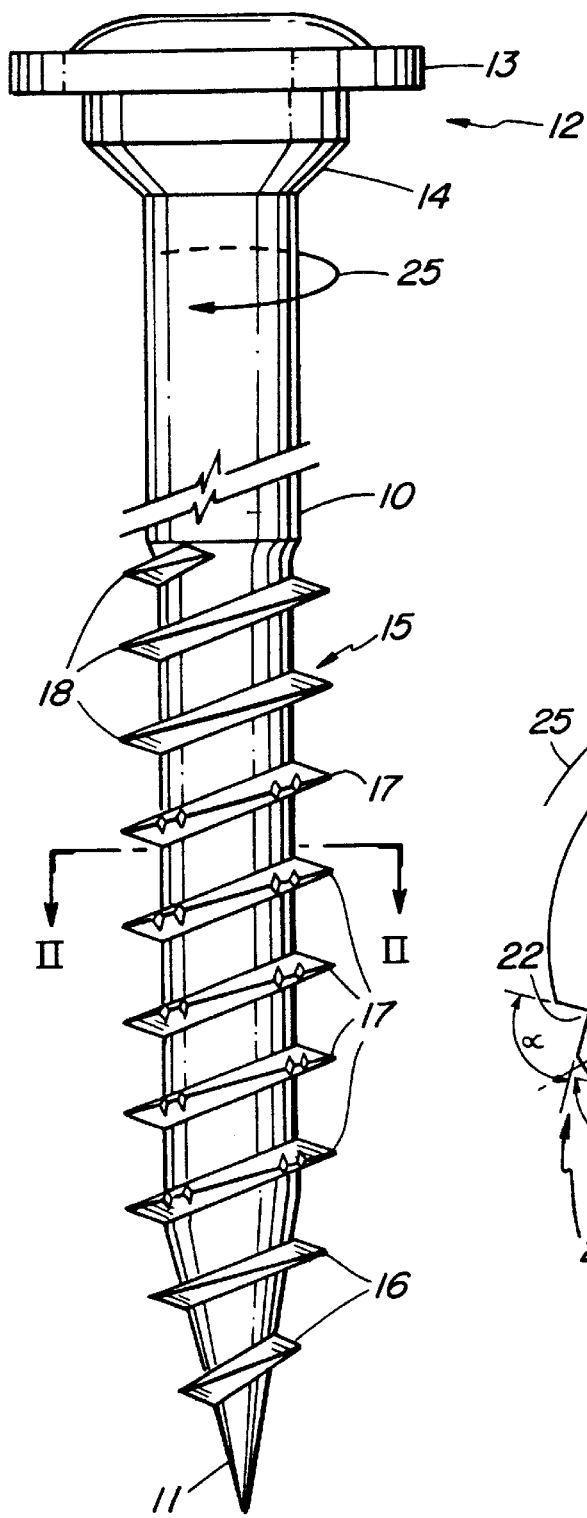
FIG. 1 is a side view of a screw of the present invention.

FIG. 1 represents an exemplary type of a woodscrew to which the present invention has been applied. The screw is integrally formed and comprises a cylindric shank portion 10 defining, at a first end, a tapering tip portion 11. The opposite, second end of the shank portion 10 merges with a head end portion 12. Preferably, the head end portion has a somewhat increased diameter to provide a smooth transition to a head 13, for instance, by a frustoconical transitional section 14. A helical thread 15 extends from the tapering tip 11 to a point spaced from the head 13. Reference number 25 designates the direction of turning the screw to drive same into a workpiece.

The embodiment shown is a screw having the length of about 250 mm. The shank 10 has a total of ten convolutes or turns, it being understood that the number of the turns is optional. Proceeding from the tip 11, there is a first thread portion having about two turns 16 which are continuous and are devoid of the cutouts. The next, intermediate, limited thread portion, includes about five turns 17 and, finally, near the second end or head end portion 12, there are about four turns 18 of the third thread portion.

Figure 2:
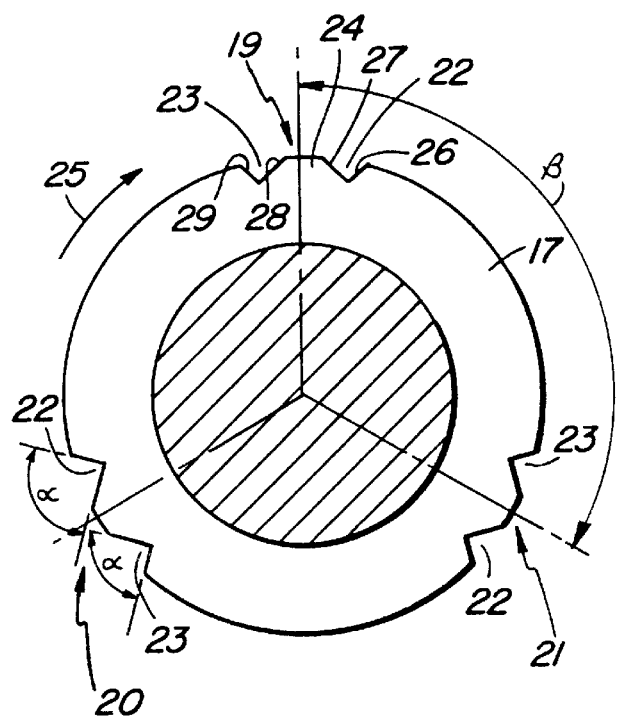
FIG. 2 is a diagrammatic sectional view taken along a section line II—II of FIG. 1 and showing one turn or convolute of the thread in a flattened-out condition to indicate the preferred distribution of the cutouts and their depth.

Each turn 17 of the limited portion is provided with radially inwardly directed cutouts (FIG. 2) 19, 20, 21. The cutouts of the first, preferred embodiment of the invention will now be described in greater detail. For simplicity, only one cutout is described 19 with reference to FIG. 2, it being understood that it is preferred that the remaining cutouts 20, 21 be of the same shape, as shown in FIG. 2.

The cutouts 19, 20, 21 are spaced from each other at an angle β of about 120° which provides the density of about three cutouts per each convolute 17. Each cutout, e.g. cutout 19, is comprised of a pair of closely spaced V-shaped or triangular, radially inwardly narrowing cutout sections 22, 23 whereby the cutout 19 has the general configuration of the letter W, defining a central tooth 24. It can be seen from the drawings that the radial depth of each cutout 19, 20, 21 is smaller than the width of the thread at the turn 17.

The recommended minimum length of the shank of the screw to fully benefit from the present invention is about 30 mm (1¼"). From the standpoint of torsional strength of the screw of the present invention, the number of threads 17, of the limited, intermediate portion is preferably selected in dependence on the overall length of the stem of the screw. For instance, screws with shanks 30 mm to 140 mm long, should have about 3 turns of threads 17 with the cutouts. Those with shank length of about 150 to about 240 mm are preferably provided with four turns of threads 17 and those over 250 mm preferably have 5 turns of threads 17. As mentioned above, the threads 17 have each three cutouts 19–21 at an equidistant arcuate spacing.

When viewed from the standpoint of rotation in the direction 25, the cutout section 22 is a front cutout section and the cutout section 23 is a rear cutout section. The cutout sections 22, 23 of the embodiment in FIG. 2 are so arranged and disposed that the tooth 24 has the shape of a trapezoid. The front cutout section 22 has a forward edge 26 and a back edge 27. Similarly, the rear cutout section 23 has a forward edge 28 and a back edge 29.

The back edge 27 defines a cutting edge of the tooth 24 and the forward edge 28 defines a trailing edge of the tooth 24. The cutout sections 22, 23 of each cutout define a void before and after the tooth 24, for debris generated by the tooth of the same cutout 19 or of the preceding cutout 21.

It can be observed from FIG. 2 that the combined width of the three cutouts 19–21 measured peripherally at the crest of the thread 17 is about one-third of the circumference of one convolute of the thread.

In the embodiment of FIG. 2, each cutout section 22, 23 is so disposed that the radially inner angle a between the respective forward edge 26, 28 and back edge 27, 29 is about 90°. This relationship is not present in further, exemplary embodiments as will now be described with reference to FIGS. 3–5 where the same reference numbers have been used to designate the corresponding elements of the screw.

Figure 3:
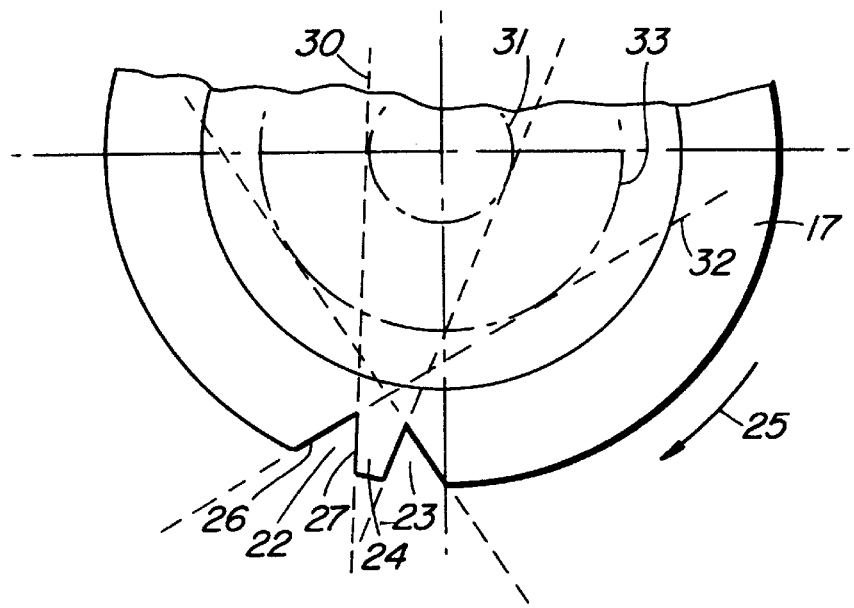
FIG. 3 is a partial, view corresponding to FIG. 2 and showing the geometry of the cutout of another embodiment of the invention.

Turning to FIG. 3, the radially inner angle between the forward edge 26 and the back edge 27 (corresponding to angle a in FIG. 2) is an acute angle. The disposition of the edges 26 and 27 is such that the back edge 27, i.e., the cutting edge 27 of the tooth 24, is on a line 30 tangent to a first reference circle 31 concentric with the axis of the shank portion 10. The edge 26, however, is on a line 32 tangent to a second reference circle 33. The diameter of the reference circle 31 is smaller than that of the reference circle 33.

Accordingly, the cutting edge 27 in FIG. 3 is radially steeper with respect to the centre of the shank portion 10 than in FIG. 2. The rear cutout section 23 is a mirror image of the front cutout section 22.

The radial steepness of the cutting edge 27 increases with the decrease of the diameter of the reference circle 31 and decreases with the enlargement of such diameter. Thus, the maximum radial steepness is the steepness where the diameter of the first reference circle is zero, i.e. it is the centre of the shank.

The overall peripheral width of this embodiment is substantially smaller than about one-third of the circumference of one turn 17 of the thread, to provide a good pullout resistance while retaining the advantage of having two voids for the debris made by each tooth 24.

Figure 4:
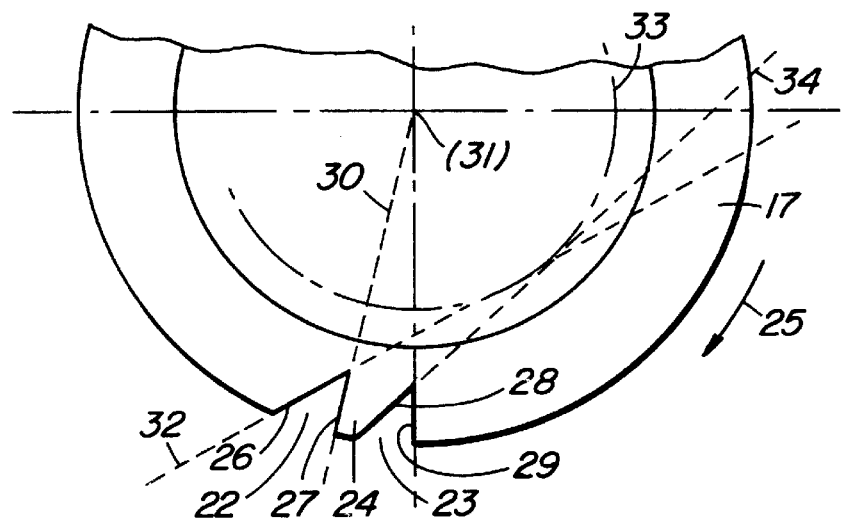
FIG. 4 is a view similar to that of FIG. 3 and showing the geometry of the cutout of yet another embodiment of the present invention.

In the embodiment of FIG. 4, the cutout sections 22, 23 are not mirror images of each other as in FIGS. 2 and 3. Instead, they have identical contour. The line 30 of the cutting edge 27 of the tooth 24 displays a maximum degree of radial steepness since the line 30 passes through the centre (31) of the shank portion 10. In other words, as already mentioned, the reference circle 30 has a zero diameter and is the centre of the shank. Thus, the cutting edge 27 extends exactly radially. On the other hand, the forward edge 26 of the recess 22 is tangent to the second reference circle 33. The forward and the back edges 28, 29 of the rear cutout section 23 are arranged in the same order as the edges 26, 27 of the front cutout section 22. Thus, the line 34 of the forward edge 28 of the cutout section 23 is a tangent to the reference circle 33, while the back edge is radial. The angle, corresponding to angle α of FIG. 2, of both V-shaped recesses of FIG. 4 is an acute angle, in the embodiment shown, about 45°. This embodiment presents a further reduction of the peripheral width of the cutout 19. The tooth 24 has the contour of an irregular trapezoid.

Figure 5:
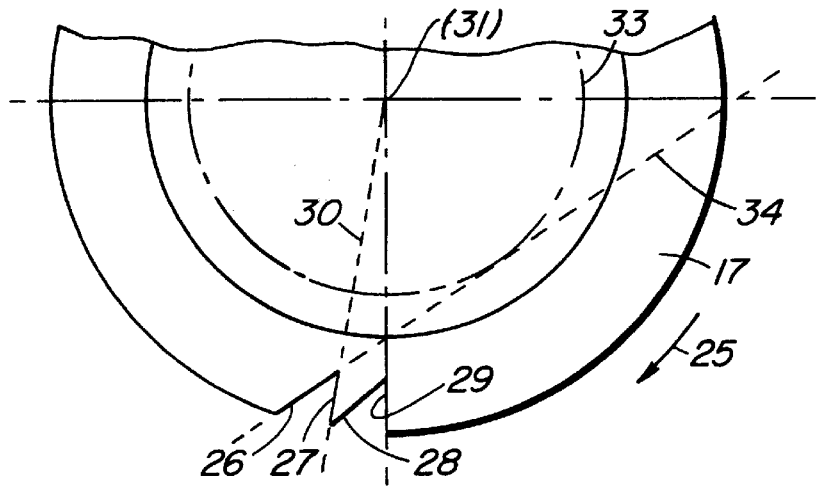
FIG. 5 is a view similar to that of FIG. 3 and showing the geometry the cutout of a further embodiment of the present invention.

The embodiment of FIG. 5 is similar to that of FIG. 4 with respect to the angles of the forward and back edges 26, 27, 28, 29 but the overall width of the tooth 24 and if the overall cutout 19 is smaller. This results in a triangular shape of the tooth 24 and in a smaller overall width of the cutout 19. The width of the cutout of the embodiment of FIG. 5 is the smallest of those shown while sufficient space is still provided for fibrous debris.

As already mentioned, the screw of the present invention is intended mainly for woodscrews or the like having the length of about one inch or more. The screw of the invention has the advantage of a reduced resistance to the driving force when the screw is driven into a workpiece. It has been found that the invention achieves reduction of the torque required by about 30% over known woodscrews. This reduces and in many cases eliminates the occurrence of breakages of the shanks of power driven screws of the present invention. While the drive-in torque stress is reduced, once the screw is in place, it does not have the tendency to become loose.

While there are certain preferred numbers of the convolutes of the thread at the tip (two) and of the cutout section (about five), generally regardless of the overall length of the screw over at least about one inch, those skilled in the art will readily appreciate that it is within the scope of the present invention to modify the numbers of the respective convolutes. Such obvious modification is merely one of a large number of changes of the screw of the present invention, which are readily conceivable and may result in a structure of a screw differing from the embodiments described, for instance, in the geometry of the cutouts, in the type of screw head used, in the number of cutouts per a convolute and in many other aspects, without departing from the scope of the invention as recited in the accompanying claims.

What is claimed is:

1. A screw fastener comprising:
   (a) a shank having a first end defining a pointed tip, an opposed second end and a thread extending over at least a portion of the overall length of the shank;
   (b) the thread being provided with a system of radially inwardly narrowing W-shaped cutouts disposed at a predetermined spacing from each other;
   (c) said system of W-shaped cutouts being comprised of a plurality of pairs of generally V-shaped cutout sections, the V-shaped cutout sections of each pair being closely spaced from each other, whereby each pair of said V-shaped cutout sections defines a generally W-shaped cutout;
   (d) the spacing between adjacent W-shaped cutouts being substantially larger than that between the V-shaped cutout sections of each said pair.

2. The fastener of claim 1, wherein only a limited portion of the overall length of the shank is provided with said W-shaped cutouts.

3. The fastener of claim 2, wherein said limited portion of the thread is an intermediate portion axially spaced from the first end of the shaft and from the second end thereof.

4. The screw of claim 3, wherein the length of the shank is at least about 25 mm, and wherein said limited portion of the thread is an intermediate portion axially spaced from the first end of the shank such that a number of convolutes of the thread at said tip are devoid of said W-shaped cutouts.

5. The screw of claim 4 wherein said number of the convolutes at the tip of the screw is about two.

6. The screw of claim 4 wherein said thread includes a number of convolutes devoid of said W-shaped cutouts and disposed between an end of the intermediate portion remote from said tip, and said second end of the shank.

7. The screw of claim 4 wherein the combined width of said W-shaped cutouts of one convolute, measured peripherally at a crest portion of the thread, is about one-third or less of the overall periphery of said one convolute.

8. The screw of claim 4, wherein said W-shaped cutouts are disposed at a density of about three W-shaped cutouts per one convolute of the thread.

9. The screw of claim 8 wherein said intermediate portion includes about five convolutes.

10. The screw of claim 1, wherein the shank is at least about 25 mm long, and wherein each W-shaped cutout includes, from the standpoint of the direction of rotation driving the screw into a workpiece:
   (a) a front V-shaped cutout section and a rear V-shaped cutout section, each V-shaped cutout section including a forward edge and a back edge;
   (b) the back edge of the front V-shaped cutout section defining a cutting edge of a central tooth of the cutout;
   (c) the forward edge of the rear V-shaped cutout section defining a trailing edge of said central tooth;
   whereby there is a void ahead of and behind said tooth.

11. The screw of claim 10, wherein the V-shaped cutout sections are of a triangular contour wherein a radially inner angle of the contour is about 90°.

12. The screw of claim 11, wherein the contour of the tooth is generally trapezoidal.

13. The screw of claim 12 wherein the V-shaped cutout sections are of a triangular contour and wherein a radially inner angle of the contour is an acute angle.

14. The screw of claim 10 wherein the cutting edge is disposed radially to the axis of the shank.

15. The screw of claim 10 wherein the V-shaped cutout sections are of a triangular contour and wherein a radially inner angle of the contour is an acute angle.

16. The screw of claim 10, wherein
   (a) the cutting edge of the tooth is disposed on a tangent to a first reference circle concentric with the centre of the shank;
   (b) the forward edge of the front V-shaped cutout section and the back edge of the rear V-shaped cutout section are each disposed on a respective tangent to a second reference circle concentric with the centre of the shank;
   (c) the diameter of said first reference circle is smaller than that of the second reference circle.

17. A screw, for use in fibrous material such as wood, comprising, in combination:
   (a) a shank having the length of at least 30 mm, said shank being provided with helical thread and having a head at one end thereof for engagement with a screw driver, and a tip at the other end;
   (b) a limited portion of an overall length of the thread being provided with generally W-shaped cutouts disposed at a predetermined spacing from each other;
   (c) said limited portion being an intermediate part of the thread axially spaced from a tip end of the thread, and from a portion of the thread near said one end of the shank;
   (d) the cutouts having a radial depth smaller than the radial width of the thread within said limited portion;
   (f) each cutout including, from the standpoint of the direction of driving rotation of the screw into a workpiece, a front V-shaped cutout section and a rear V-shaped cutout section each section having a generally triangular configuration:
   (g) said front V-shaped cutout section having a forward edge and a back edge, said rear V-shaped cutout section having a forward edge and a back edge;
   (h) the back edge of the front V-shaped cutout section and the forward edge of the rear V-shaped cutout section defining a central tooth corresponding to a central crest portion of the W;
   (i) said tooth having a leading cutting edge corresponding to said back edge of said forward V-shaped cutout section, and a trailing edge corresponding to said forward edge of the rear V-shaped cutout section
   (j) the cutting edge of the tooth being disposed on a tangent to a first reference circle concentric with the centre of the shank, the forward edge of the front V-shaped cutout section being disposed on a second reference circle concentric with the centre of the shank, the diameter of said first reference circle being smaller than that of the second reference circle, whereby a radial steepness of said leading edge is smaller than that of the cutting edge.

18. A screw, for use in fibrous material such as wood, comprising, in combination:
   (a) a shank having the length of at least 30 mm, said shank being provided with helical thread and having a head at one end thereof for engagement with a screw driver, and a tip at the other end;
   (b) a limited portion of an overall length of the thread being provided with generally W-shaped cutouts disposed at a predetermined spacing from each other;
   (c) said limited portion being an intermediate part of the thread axially spaced from a tip end of the thread, and from a portion of the thread near said one end of the shank;
   (d) the cutouts having a radial depth smaller than the radial width of the thread within said limited portion;
   (f) each cutout including, from the standpoint of the direction of driving rotation of the screw into a workpiece, a front V-shaped cutout section and a rear V-shaped cutout section each section having a generally triangular configuration:
   (g) said front V-shaped cutout section having a forward edge and a back edge, said rear V-shaped cutout section having a forward edge and a back edge;
   (h) the back edge of the front V-shaped cutout section and the forward edge of the rear V-shaped cutout section defining a central tooth corresponding to a central crest portion of the W;
   (i) said tooth having a leading cutting edge corresponding to said back edge of said forward V-shaped cutout section, and a trailing edge corresponding to said forward edge of the rear V-shaped cutout section, wherein the cutting edge of the tooth is disposed on a tangent to a first reference circle concentric with the centre of the shank, the forward edge of the front cutout section being disposed on a second reference circle concentric with the centre of the shank, the diameter of said first reference circle being smaller than that of the second reference circle, whereby a radial steepness of said leading edge is smaller than that of the cutting edge,
   (j) said predetermined spacing of the cutouts being selected such that the combined width of the W-shaped cutouts at the crest of the thread of one said convolute is about one-third or less of the overall periphery of the crest of the thread in said one convolute
   (k) the diameter of said first reference circle being zero, whereby the cutting edge is coincident with a radial line.

* * * * *